United States Patent
Chen et al.

(10) Patent No.: US 11,153,308 B2
(45) Date of Patent: Oct. 19, 2021

(54) BIOMETRIC DATA CONTEXTUAL PROCESSING

(71) Applicant: Visa International Service Association, San Francisco, CA (US)

(72) Inventors: Yuexi Chen, Foster City, CA (US); Andreas Aabye, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 259 days.

(21) Appl. No.: 16/455,527

(22) Filed: Jun. 27, 2019

(65) Prior Publication Data

US 2020/0412715 A1    Dec. 31, 2020

(51) Int. Cl.
*H04L 29/06* (2006.01)
*H04W 12/06* (2021.01)
*H04W 12/65* (2021.01)

(52) U.S. Cl.
CPC ......... *H04L 63/0861* (2013.01); *H04W 12/06* (2013.01); *H04W 12/65* (2021.01)

(58) Field of Classification Search
None
See application file for complete search history.

(56) References Cited

U.S. PATENT DOCUMENTS

| | | | |
|---|---|---|---|
| 5,870,723 A | 2/1999 | Pare, Jr. et al. | |
| 9,256,871 B2 | 2/2016 | Anderson et al. | |
| 9,727,858 B2 | 8/2017 | Anderson et al. | |
| 9,848,052 B2 | 12/2017 | Kumnick | |
| 9,876,788 B1* | 1/2018 | Ziraknejad | G06F 21/34 |
| 10,135,820 B2 | 11/2018 | Wagner | |
| 10,230,710 B2 | 3/2019 | Wang | |
| 10,291,610 B2 | 5/2019 | Chang et al. | |
| 11,100,208 B2* | 8/2021 | Kim | G06F 21/32 |
| 2005/0071635 A1* | 3/2005 | Furuyama | G06F 21/32 713/168 |
| 2006/0248020 A1 | 11/2006 | Robinson | |
| 2006/0265602 A1 | 11/2006 | Robinson | |
| 2010/0175114 A1* | 7/2010 | Little | G06F 21/32 726/5 |
| 2010/0250944 A1* | 9/2010 | Suzuki | H04L 63/0861 713/172 |
| 2012/0259782 A1 | 10/2012 | Hammad | |
| 2013/0104203 A1* | 4/2013 | Davis | H04L 63/0861 726/5 |
| 2014/0133710 A1* | 5/2014 | Hama | G06F 21/32 382/115 |
| 2015/0112871 A1 | 4/2015 | Kumnick | |
| 2015/0180866 A1* | 6/2015 | Hama | G06F 21/32 726/6 |

(Continued)

*Primary Examiner* — Piotr Poltorak
(74) *Attorney, Agent, or Firm* — Kilpatrick Townsend & Stockton LLP

(57) ABSTRACT

A method is disclosed. The method includes obtaining a biometric match score from a device that is used to conduct an interaction at a location and then receiving additional data associated with the device or the location. The method also includes determining, by the computer, an expected match score function based upon at least the additional data, and comparing the biometric match score to the expected match score function. The method also includes determining if the interaction is to proceed based on at least the comparing.

20 Claims, 9 Drawing Sheets

(56) References Cited

U.S. PATENT DOCUMENTS

| | | | |
|---|---|---|---|
| 2015/0254445 A1* | 9/2015 | Takagi | G06F 9/5083 |
| | | | 726/7 |
| 2016/0042219 A1* | 2/2016 | Bae | G06K 9/00013 |
| | | | 382/124 |
| 2016/0135046 A1* | 5/2016 | John Archibald | H04W 12/082 |
| | | | 455/411 |
| 2016/0140542 A1 | 5/2016 | Hammad | |
| 2016/0178906 A1* | 6/2016 | Rider | H04W 12/06 |
| | | | 726/17 |
| 2017/0142101 A1* | 5/2017 | Connell, II | G06F 21/32 |
| 2017/0171195 A1 | 6/2017 | Chang et al. | |
| 2018/0083955 A1* | 3/2018 | Tuli | H04L 65/1069 |
| 2018/0211022 A1 | 7/2018 | Wagner et al. | |
| 2018/0268405 A1 | 9/2018 | Lopez | |
| 2018/0341760 A1* | 11/2018 | Frempong | G06F 21/32 |
| 2019/0050865 A1 | 2/2019 | Sheets et al. | |
| 2019/0156335 A1 | 5/2019 | Safak et al. | |
| 2019/0158491 A1* | 5/2019 | Burmester | H04L 63/105 |
| 2019/0164156 A1* | 5/2019 | Lindemann | H04L 9/3239 |
| 2020/0285726 A1* | 9/2020 | Kalous | G07C 9/00182 |

\* cited by examiner

BIOMETRIC DATA CONTEXTUAL PROCESSING

CROSS-REFERENCES TO RELATED APPLICATIONS

None.

BACKGROUND

Biometric authentication processes are becoming more prevalent. In a biometric authentication process, a user can provide a biometric sample such as a voice sample to a computer. The computer can form biometric data from the biometric sample and can determine if the sample biometric data and stored biometric data match, and are thus indicative of the same user. A match can be present when the similarity of the features of the stored biometric data and the features in the sample biometric data exceed a predetermined threshold (e.g., 95%).

While conventional biometric authentication processes are useful, they may not be reliable or useful under every possible situation. For example, a user that is trying to authenticate himself with his voice to his phone to access an application on the phone may be on a train that has a significant amount of background noise. As a result, the voice sample that is captured by the phone and that is converted to voice sample data may be very different from the stored voice sample on the phone. The user may consequently be unable to obtain the desired access to the application.

Also, fraudulent biometric templates can also be potentially used by unauthorized persons to impersonate authentic users. In such cases, it can be difficult to tell if the fraudulent biometric template is real or not.

Embodiments of the invention address these and other problems, individually and collectively.

BRIEF SUMMARY

An embodiment of the invention includes: obtaining, by a computer, a biometric match score from a device conducting an interaction at a location; receiving, by the computer, additional data associated with the device or the location; determining an expected match score function based upon at least the additional data; comparing, by the computer, the biometric match score to the expected match score function; and determining, by the computer, if the interaction is to proceed based on at least the comparing.

Another embodiment includes a computer comprising: a processor; and a computer readable medium coupled to the processor for implementing a method comprising: obtaining a biometric match score from a device associated with a user conducting an interaction at a location; receiving additional data associated with the device or the location; determining an expected match score function based upon at least the additional data; comparing, by the computer, the biometric match score to the expected match score function; and determining, by the computer, if the interaction is to proceed based on at least the comparing.

Another embodiment includes a method comprising: receiving, by a device, a biometric sample from a user; determining, by the device, a biometric match score; and transmitting, by the device, the biometric match score to a processing computer, wherein the processing computer determines an expected match score function based upon at least additional data associated with the device or a location of the device, compares the biometric match score to the expected match score function, and determines if the interaction is to proceed based on at least the comparing.

Further details regarding embodiments of the invention can be found in the Detailed Description and the Figures.

DETAILED DESCRIPTION

Figure 1A:
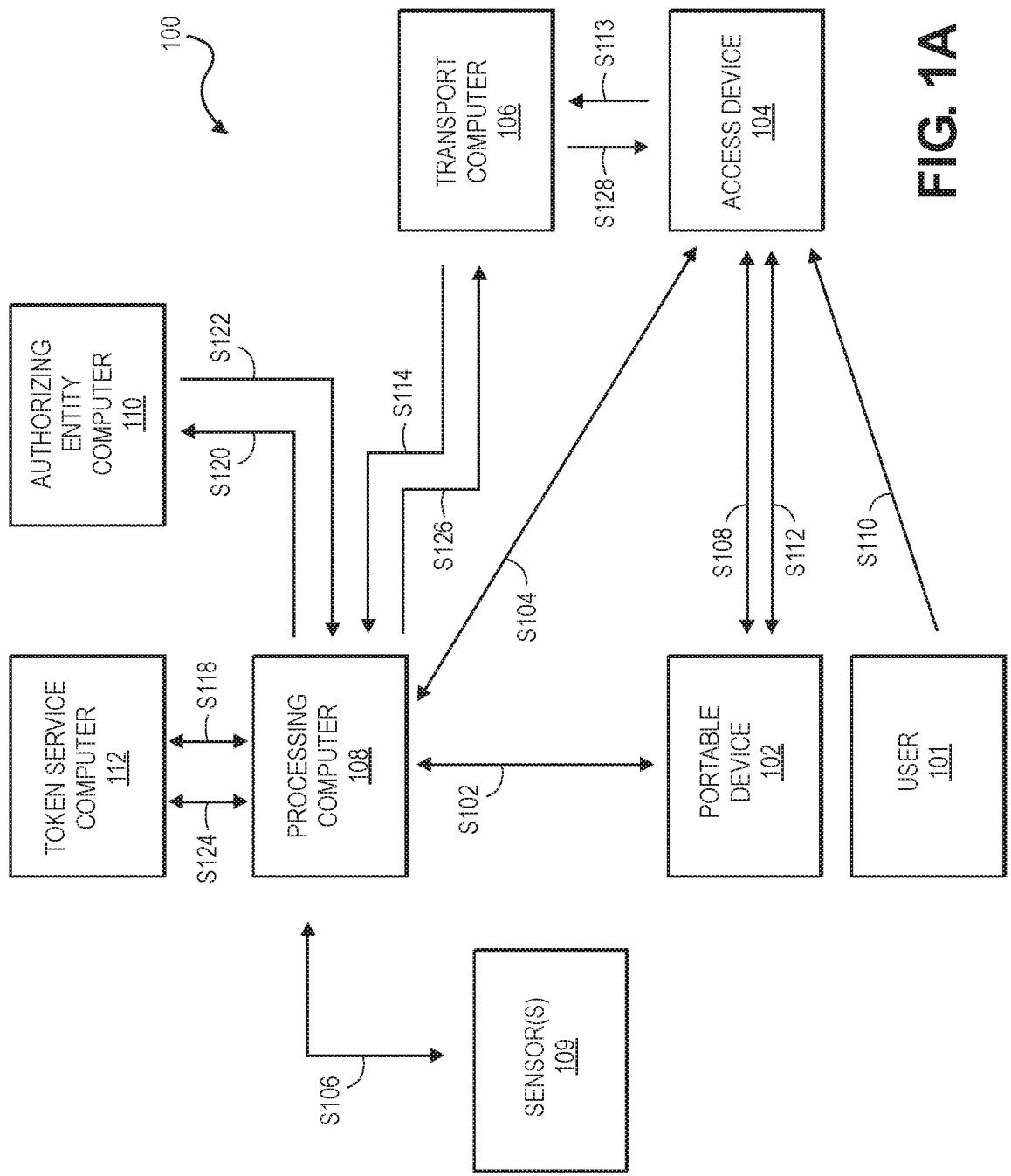
FIG. 1A shows a block diagram of a system according to an embodiment.

In embodiments, a biometric authentication device in the form of an access device (e.g., a POS terminal) can capture a user's biometric sample. For example, a fingerprint can be captured by the access device. The fingerprint is converted by the access device to data representing the fingerprint. The data representing the fingerprint is passed by the access device to a user's portable device, which may be a card. The card executes a match algorithm to compare the captured fingerprint against an enrolled fingerprint template on the user's portable device. The match algorithm can output a match score, e.g. 0.8644. The portable device can compare the match score with a threshold, e.g. 0.82, and can determine if the match score exceeds the threshold. The portable device can generate portable device data that includes the match score and other data such as credentials (e.g., an account number) signed using a portable device secret key (e.g. symmetric TDES/AES or asymmetric RSA/ECC). The generated portable device data is then passed to the access device.

The access device then generates and transmits an authorization request message to an authorizing entity computer via a processing computer in a processing network. The authorizing entity computer receives the authorization request message, verifies the integrity of the card data, and extracts the match score. The authorizing entity computer can check the match score to see if it exceeds a threshold, and to see if it is close to an expected match score that is based upon data relating to the location of the interaction (e.g., environmental context data such as temperature or humidity) or device data. This can be used to determine if the biometric sample that was used was potentially forged or otherwise not authentic. For example, if the user's fingerprint match score for a prior transaction is high >0.95, then given the same environmental data (location, indoor/outdoor, temperature, consistency of the biometric capture performance), if the match score dropped, then the risk that the biometric sample is not authentic is elevated. This risk level can be used to determine if the transaction should or should not proceed.

In other embodiments, the biometric authentication device could alternatively be the user's portable device. The user's portable device could receive the biometric sample, perform matching, and then output a match score to the access device.

Prior to discussing embodiments of the invention, some terms can be described in further detail.

An "access device" (which may be an example of a terminal) may be any suitable device for accessing a remote system or computer. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, the access device may also include a biometric reader capable of capturing biometric samples, in which case, the access device may be a "biometric terminal". A terminal may support one or more cardholder verification methods including biometric verification, PIN, signature, etc.

A "biometric sample" includes data that can be used to uniquely identify an individual based upon one or more intrinsic physical or behavioral traits. For example, a biometric sample may include retinal scan and tracking data (i.e., eye movement and tracking where a user's eyes are focused). Further examples of biometric samples include a face, fingerprint, voiceprint, palm print, DNA, body scan, etc.

A "biometric sample template" can be a digital representation of an obtained biometric sample. In some embodiments, the biometric sample template can represent one or more biometric samples including variable features associated with biometric samples such as facial images and voice samples.

A "biometric reference template" can be a digital representation of biometric sample that has been previously enrolled or stored. For example, a biometric reference template may be a digital representation of characteristics that have been extracted from one or more biometric samples that have been enrolled with a verification entity by a cardholder so that the cardholder may be verified at a later point in time.

A "biometric data block" or BDB can be any data that contains one or more biometric sample templates and may also contain additional information that is relevant to the process of biometric verification. A biometric data block may be encrypted in some embodiments. In some embodiments, a "biometric program" may operate directly on the encrypted BDB e.g. homomorphic matching algorithm. The biometric program may need decrypt the BDB first, and then perform a match process using a matching algorithm.

In some embodiments, a "biometric program" can be a set of instructions communicated between an integrated chip card and a compatible biometric terminal. In other embodiments, a "biometric program" can be a set of instructions communicated between an integrated chip card and a biometric sensor on the same chip card. Biometric programs may be standardized, and portable devices and terminals capable of performing a biometric program may be certified to ensure security and reliability.

A "biometric matching object" or BMO can be a data element that contains one or more biometric reference templates and a biometric program. A BMO can have a specific biometric type and biometric subtype signifying the type of biometric reference template it contains (finger, palm, iris, face, voice, etc.) and the subtype of the reference template (right index finger, left iris, left middle finger, etc.) respectively.

A "biometric information template" or BIT can be a data element that provides descriptive information regarding biometric formats and biometric processes supported on a portable device.

A "biometric solution ID" can be a data element that ensures that a biometric card certified by a biometric program will only perform biometric verification on a terminal that is certified by the same biometric program. Terminals and cards certified by the same program can be assigned the same biometric solution ID.

A "cardholder verification method" or CVM can be any method used to verify the authenticity of a cardholder (or other user) in a transaction. For example, a CVM can be an online PIN verification, a signature verification, an Offline PIN verification, a biometric verification (e.g. finger, palm, iris, voice, face, etc.), etc. A "cardholder verification method" can be generically referred to as a "user verification method."

A "CVM list" can be a list of CVMs that a cardholder may be verified with and identifies which methods of verification of the cardholder are supported by a payment application or payment applet.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes, login information, etc.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g., memory element or secure element) that may be executable by a processor to complete a task. Examples of an application include a biometric sample application, an authentication application, or a processing network application. An application may include a mobile application. An application can also be a utility program performing one or a predesignated set of functions and be referred to as an "applet". An application may be designed to streamline the purchase and payment process or the process for accessing a secure area or secure data. An application may enable a user to initiate a transaction with a resource provider or merchant and authorize the transaction.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4123 4500 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement. Detokenization refers to the reversal of tokenization, in which the substitute data is replaced by the sensitive data so that the transaction may be processed and/or authorized.

A "user" may include an individual. In some embodiments, a user may be associated with one or more personal accounts and/or mobile devices. The user may also be a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically be a business entity (e.g., a bank) that maintains an account for a user. An issuer may also issue payment credentials stored on a user device, such as a cellular telephone, smart card, tablet, or laptop to the consumer. An issuer can also be a verification entity that verifies the authenticity of a user and sets verification entity preferences.

An "authorization system" may refer to a system that can authorize transactions or aspects of transactions. In some embodiments, an authorization system may utilize information to determine the probability or likelihood that a transaction is fraudulent.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to a payment device (such as account number, CVV values, expiration dates, etc.) may be securely transmitted between the two entities to facilitate a transaction.

A "portable device" may include a device that is portable. A portable device may be used to conduct a financial transaction to pay for a good or service, and may be a "payment device." A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, an electronic or digital wallet, and the like. If the payment device is in the form of a debit, credit, or smartcard, the payment device may also optionally have features such as magnetic stripes. Such devices can operate in either a contact or contactless mode. A portable device may also include an integrated circuit such as a chip or microchip and may be referred to as an integrated circuit card or ICC. Other types of payment devices may include wearable devices (e.g., smartwatches, rings, etc.), or vehicles with remote communication capabilities (e.g., automobiles).

A "server computer" is typically a powerful computer or cluster of computers. For example, the server computer can be a large mainframe, a minicomputer cluster, or a group of servers functioning as a unit. In one example, the server computer may be a database server coupled to a Web server.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile communication device or access device.

"Additional data associated with a device or a location" may include any suitable information about the device or the location at which the device is interacting. Data about the device may include information such as model number, an age of the device, a state of the device such as the power state of the device, the repair history of the device, etc. Data about a location may include information such as the environmental conditions associated with a location. Environmental conditions may include the temperature, humidity, light levels, noise, pollution, or wind speed at the location.

An "expected match score function" may include a mathematical model or function that can be used to predict an expected match score given a set of dependencies. For example, expected match scores for a biometric matching process may be dependent upon a device type, temperature and humidity. If a device type, temperature, and humidity are provided, an exemplary expected match score function may output an expected match score.

A "biometric match score" may be a value that expresses a likelihood of achievement of a biometric match. A biometric match score may include any suitable value within a range of values. For example, a biometric match score may be a score between 0 to 1, or 0 to 100.

An "interaction" can be a reciprocal action, effect, or influence. An interaction, for example, could be an exchange or transaction between two or more parties. Examples of transactions can include payment transactions, data access transactions, and location access transactions.

FIG. 1A shows a system 100 according to an embodiment. The system 100 includes a portable device 102. The portable device 102 can be in long range, or short range communication or in contact with an access device 104. If the access device 104 is in long range communication with the portable device 102, the access device 104 may be an application server computer associated with a service provider application on the portable device 102 or may be a Web server. If the access device 104 is in short range communication or in contact with the portable device 102, then the access device 104 may be a point of sale terminal or kiosk.

In some embodiments, the portable device 102, sensor(s) 109, and the access device 104 may also be in short or long range communication (e.g., via a cellular network and/or the Internet) with a processing computer 108. The processing computer 108 can be in communication with the token service computer 112, an authorizing entity computer 110, and the access device 104 via a transport computer 106. In some embodiments, the authorizing entity computer 110 may be operated by an issuer of a payment account number, and the processing computer 108 may be operated by a payment processing organization that performs authorization, clearing, and settlement services on behalf of issuers and acquirers.

The sensor(s) 109 may include any suitable type of sensor that can measure conditions (e.g., environmental conditions) at a location. Examples of sensors can include temperature sensors, wind speed sensors, light sensors, humidity sensors, etc.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

It is noted that not embodiments are not limited to the system and the components illustrated in FIG. 1A. For example, in other embodiments, the token service computer 112 may be omitted if a real credential is used in a transaction instead of a token. In some embodiments, the transport computer 106 is not needed. In other embodiments, the authorizing entity can perform the functions of the processing computer 108, so the processing computer 108 may not be needed in some embodiments.

Figure 1B:
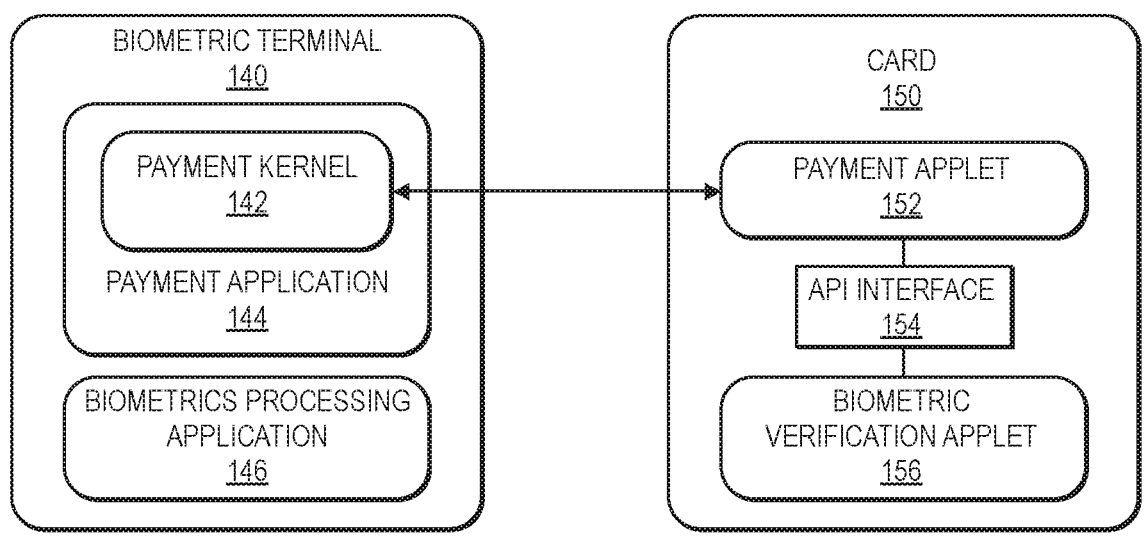
FIG. 1B shows a diagram of a biometric terminal and a card interacting with each other.

FIG. 1B shows a block diagram of a subsystem that can be used as part of the method of performing biometric verification according to an embodiment of the invention. System 160 comprises a biometric terminal 140, which can be an example of the access device 104 in FIG. 1A, and a card 150. Although a card 150 is specifically illustrated, the card 150 could alternatively be any suitable portable device.

Biometric terminal 140 comprises a payment application 144. Payment application 144 may comprise software used to process a payment transaction. Payment application 144 may accept a payment amount as an input and return a transaction result as an output. Payment application 144 may communicate with card 150 in a transaction using payment kernel 142. Payment kernel 142 may comprise a set of functions that provide all necessary processing logic and data that is used to perform a contact or contactless transaction. An exemplary payment kernel 142 may be an EMV (Europay, MasterCard, and Visa) Kernel. Payment kernel 142 may follow EMV ICC (Integrated Circuit Card) specifications for payment systems which form the basis of all EMV compliant terminals.

Biometric terminal 140 also comprises biometric processing application 146, which may, in conjunction with a data processor, process a biometric sample captured by a biometric reader in the biometric terminal 140. In one embodiment, biometric processing application 146 is implemented as an integrated part of biometric terminal 140. In another embodiment, biometric processing application 146 is a separate component from biometric terminal 140.

Biometric processing application 146 may support the processing of at least one type of biometric sample and/or biometric sample template. In some embodiments, if biometric processing application 146 supports finger verification, it may be able to support the processing of a biometric sample template of any one of ten fingers belonging to a user and may support the processing of a biometric sample template of up to all ten fingers of the user. Similarly, if it supports palm verification, biometric processing application 146 may support the processing of a biometric sample template of either left or right palms or both palms belonging to the user. If biometric processing application 146 supports iris verification, it may support the processing of a biometric sample template of either left and right irises belonging to the user or both. Biometric processing application 146 may be able to construct a Biometric Data Block (BDB) comprising the biometric sample template captured by the biometric reader and communicate the BDB to payment application 144. In one embodiment, the BDB may be encrypted using appropriate encryption keys so that a cardholder's biometric sample template cannot be obtained by an untrusted party.

Card 150 comprises payment applet 152, API interface 154, and biometric verification applet 156. In a transaction, a user inserts card 150 into a card reader of biometric terminal 140 and then card 150 may communicate with biometric terminal 140 using payment applet 152. Payment applet 152 may manage interactions between card 150 and biometric terminal 140 including biometric verification try counters, biometric verification results, and biometric related card risk management checks. An exemplary payment applet 152 may be Visa Smart Debit/Credit (VSDC) applet. To support biometric verification, payment applet 152 may contain a list of cardholder verification methods or CVM list, which may define a set of bits that indicate the support of a type of biometric verification on card 150.

Using the CVM list, biometric terminal 140 may learn the capabilities of card 150 and select the appropriate CVM (i.e. appropriate type of biometric verification) to perform in a transaction.

Payment applet 152 may communicate with biometric verification applet 156 using API interface 154. In one embodiment, API interface 154 may be the Interface BioTemplate provided by Java Card 2.2.2. In one embodiment, payment applet 152 and biometric verification applet 156 may be implemented as one applet combining both functionalities.

Biometric verification applet 156 may contain one or more biometric reference templates. Biometric verification applet 156 may also perform template matching by comparing a biometric sample template with the one or more biometric reference templates. After comparing the biometric sample template with one or more biometric reference templates, it may generate a biometric verification result and send it to payment applet 152.

Biometric verification applet 156 may support at least one biometric verification method using any suitable type of biometric sample. In some embodiments, if biometric verification applet 156 supports finger verification, it may be able to support the verification of any one of ten fingers belonging to a user and may support the verification of up to all ten fingers of the user. Similarly, if it supports palm verification, biometric verification applet may support the verification of either left or right palms or both palms belonging to the user. If biometric verification applet 156 supports iris verification, it may support the verification of either left and right irises belonging to the user or both.

According to embodiments of the invention, a user enrolls his or her biometric reference template(s) on card 150. In one embodiment, the biometric reference template(s) may be enrolled with an issuer of card 150. When the card 150 or other portable device is issued by the issuer or any time after issuance, the issuer may request a biometric sample from the eventual user of the card and this biometric sample may be converted to a reference biometric template and may be stored on the card. The request may occur, for example, at a local branch of the issuer (e.g., a local bank), or the request may occur over a remote communications network (e.g., over the Internet). In the latter case, the user may have a biometric reader that can obtain a biometric sample from the user, and a device that can write any biometric reference template to their portable device.

The issuer of card 150 may also serve as a verification entity. The verification entity may also issue verification entity preferences that may be stored on card 150 along with the biometric reference template(s). Examples of verification entity preferences may include a preferred biometric type or preferred biometric subtype to be verified and/or a preferred amount of retries for a given biometric type or biometric subtype. A biometric type may be a particular type of biometric sample such as a finger sample, palm sample, iris sample, face sample, voice sample, etc. A biometric subtype may be a specific aspect of a specific type of biometric sample. For example, a subtype of a fingerprint biometric sample may be a right index finger, a left iris, a left middle finger, etc.

Biometric verification applet 156 may store biometric reference template data comprising a biometric reference template and verification entity preferences in the form of Biometric Matching Objects (BMOs), each of which supports a matching mechanism. Each BMO may comprise a biometric program(s) identified by a biometric solution ID(s) under which the matching mechanism is certified as well as a type of biometric verification to be performed by the matching mechanism. Each BMO may indicate the type of biometric reference template it contains (finger, palm, iris, face, voice, etc.) and the subtype of the reference template (right index finger, left iris, left middle finger, etc.). The biometric subtype may also indicate that the BMO may contain multiple biometric reference templates. For example, if the BMO contains multiple biometric reference templates, then the BMO may support 1:N matching, wherein a biometric sample template may be compared to N number of biometric reference templates stored in the BMO and matching may be deemed successful if the biometric sample template matches any one of the biometric reference templates.

The biometric reference template stored on the card may include a template that is completely in standardized format, completely in proprietary format, or a combination of partially standardized format and partially proprietary format. Information regarding biometric formats and solutions supported on card 150 may be present within a biometric information template (BIT) stored on payment applet 152. In some embodiments, the data in the BIT may be Tag-Length-Value (TLV). For example, the BIT may contain a biometric header indicating that the data in the BIT is compliant with a specific file exchange format.

In a verification session, biometric verification applet 156 may provide biometric verification results (e.g., a match result, or the actual determination of whether a match is present, a match score, etc.) to payment applet 152. In one embodiment, other data that can be provided can include an error message, offline biometric verification reliability index, False Accept Rate (FAR), False Reject Rate (FRR), threshold of match score, and/or any data regarding the number of verification attempts made by the user.

In one embodiment, the BDB containing the biometric sample templates may be enciphered and card 150 may contain a data encipherment key that may be used to decipher the BDB. For example, when card 150 receives enciphered biometric data from biometric terminal 140 during a transaction, payment applet 152 may decrypt enciphered biometric data to recover the biometric sample template captured by biometric terminal 140. Then, payment applet 152 may determine how to forward the BDB containing the biometric sample template captured by biometric terminal 140 to biometric verification applet 156 for verification. In some embodiments, an issuer of card 150 or a verification entity may have a specific data encipherment key known as a data encipherment master derivation key. In one embodiment, decipherment may be performed according to an RSA-KEM algorithm defined in [ISO 18033-2].

Once payment applet 152 has received the biometric verification result and the other data from biometric verification applet 156, it may provide the biometric verification results and the other data to biometric terminal 140 so that the biometric verification may be completed and the transaction may be processed. In one embodiment, the issuer of card 150 or the verification entity may also serve as an authorization entity that authorizes a transaction, and the biometric verification results received by biometric terminal 140 may be forwarded along with the other data to the authorization entity in the form of an authorization request message so that the transaction may be approved or declined.

By forwarding additional data such as an error message, offline biometric verification reliability index, False Accept Rate (FAR), False Reject Rate (FRR), threshold of match score, and/or any data regarding the number of verification attempts made by the user to an authorization entity such as an issuer, the issuer can make determinations as to how to improve the authentication process or modify fraud detection processes. For instance, an issuer might use the number of verification attempts for each type of biometric to determine which type of biometric sample or subtype thereof might be best in authenticating a user. If many legitimate users use a retinal scan and routinely exceed the designated number of verification attempts, then this may indicate that the process is not as reliable as other processes involving other biometric samples. With regard to fraud processing, a low number of attempts may indicate a lower likelihood of fraud, while a higher number of attempts may indicate a higher likelihood of fraud.

Note that FIG. 1B shows one exemplary implementation. In other embodiments, the card 150 may contain a biometrics processing application and biometric sensors that can receive a biometric sample from the user. In this case, a biometric template would not be passed from the biometric terminal 140 to the card 150.

Figure 2A:
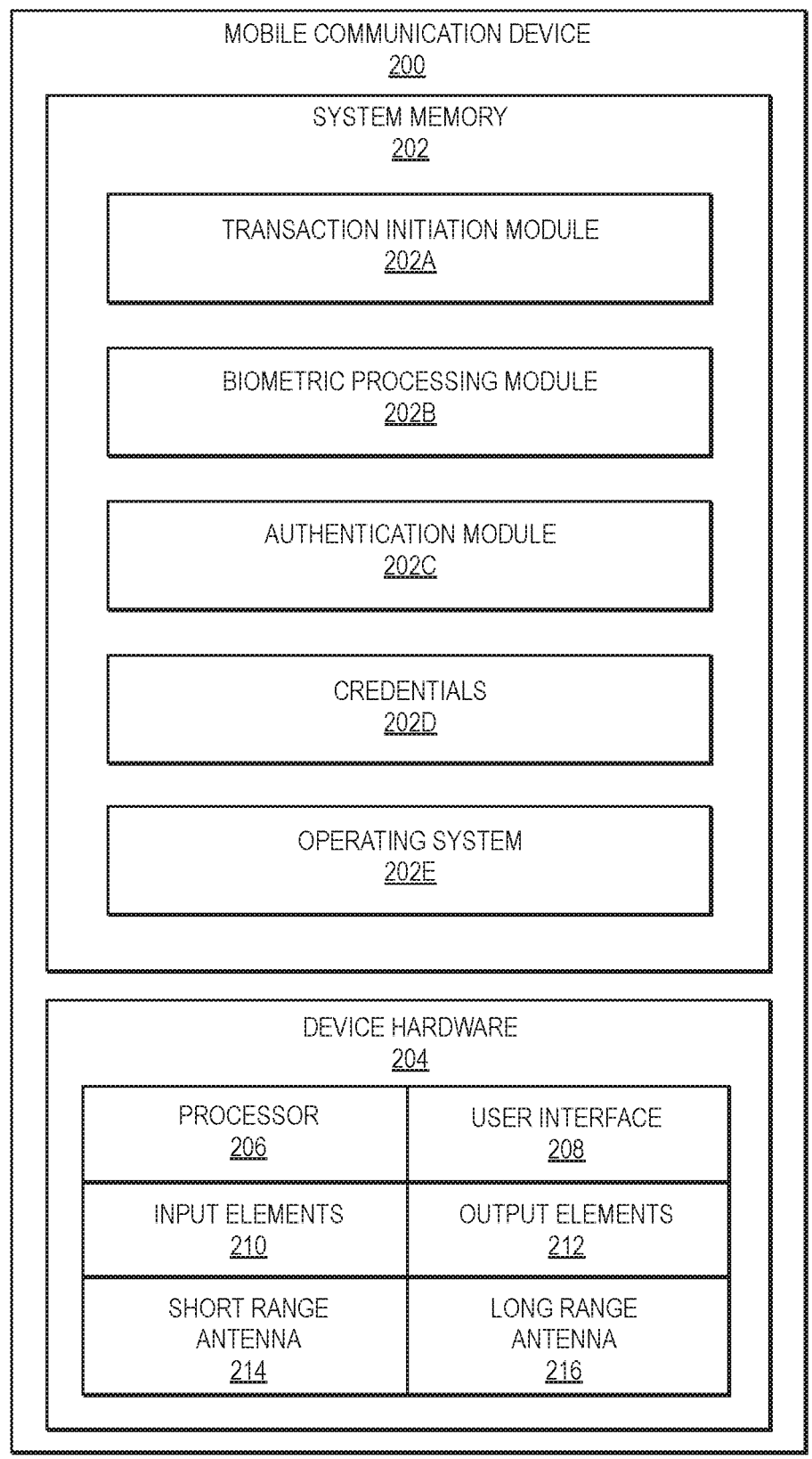
FIG. 2A shows a block diagram of a portable device in the form of a mobile communication device according to an embodiment.

FIG. 2A illustrates a mobile communication device 200 according to an embodiment. The features in the card 150 in FIG. 1B may also be included in the mobile communication device 200. Mobile communication device 200 may include device hardware 204 coupled to a system memory 202.

Device hardware 204 may include a processor 206, a short range antenna 214, a long range antenna 216, input elements 210, a user interface 208, and output elements 212 (which may be part of the user interface 208). Examples of input elements may include microphones, keypads, touchscreens, sensors (e.g., for sensing environmental conditions), etc. Examples of output elements may include speakers, display screens, and tactile devices. The processor 206 can be implemented as one or more integrated circuits (e.g., one or more single core or multicore microprocessors and/or microcontrollers), and is used to control the operation of mobile communication device 200. The processor 206 can execute a variety of programs in response to program code or computer-readable code stored in the system memory 202, and can maintain multiple concurrently executing programs or processes.

The long range antenna 216 may include one or more RF transceivers and/or connectors that can be used by mobile communication device 200 to communicate with other devices and/or to connect with external networks. The long range antenna 216 may be configured to communicate with a remote base station and a remote cellular or data network, over the air. The user interface 208 can include any combination of input and output elements to allow a user to interact with and invoke the functionalities of mobile communication device 200. The short range antenna 214 may be configured to communicate with external entities through a short range communication medium (e.g. using Bluetooth, Wi-Fi, infrared, NFC, etc.).

The system memory 202 can be implemented using any combination of any number of non-volatile memories (e.g., flash memory) and volatile memories (e.g. DRAM, SRAM), or any other non-transitory storage medium, or a combination thereof media. The system memory 202 may store computer code, executable by the processor 206, for performing any of the functions described herein. For example, the system memory 202 may comprise a computer readable medium comprising code, executable by the processor 206, for implementing a method comprising: receiving, by a device, a biometric sample from a user; determining, by the device, a biometric match score; and transmitting, by the device, the biometric match score to a processing computer, wherein the processing computer determines an expected match score function based upon at least additional data associated with the mobile communication device or a location of the mobile communication device, compares the biometric match score to the expected match score function, and determines if the interaction is to proceed based on at least the comparing.

The system memory 202 may also store a transaction initiation module 202A, biometric processing module 202B, an authentication module 202C, credentials 202D, and an operating system 202E. The transaction initiation module 202A may include instructions or code initiating and conducting a transaction with an external device such as an access device or a processing computer. It may include code, executable by the processor 206, for generating and transmitting authorization request messages, as well as receiving and forwarding authorization response messages. It may also include code, executable by the processor 206, for forming a local connection or otherwise interacting with an external access device. The biometric processing module 202B may comprise code, executable by the processor 206, to receive a biometric template or data and match it to a stored biometric template or data to determine a match result. The authentication module 202C may comprise code, executable by the processor 206, to authenticate a user. This can be performed using user secrets (e.g., passwords) or user biometrics.

System memory 202 may also store credentials and/or tokens 202D. Credentials may also include information identifying the mobile communication device 200 and/or the user of the mobile communication device 200. Examples of credentials may include a public key associated with the mobile communication device 200 and/or a user of the mobile communication device 200, a digital signature (e.g., the public key of the mobile communication device 200 signed by a key of the authentication system), payment credentials, biometric data (e.g., biometric samples or templates), etc.

Figure 2B:
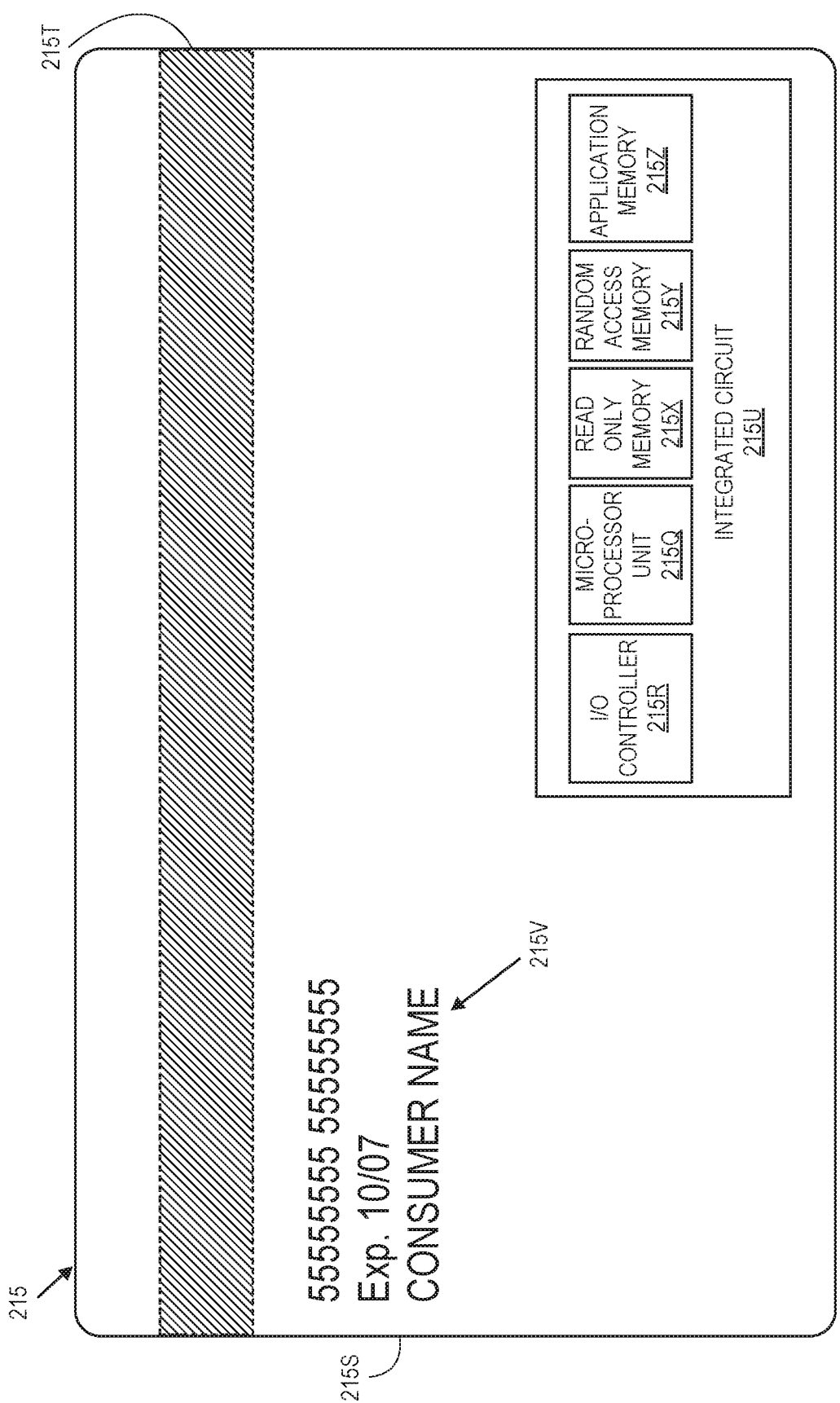
FIG. 2B shows a diagram of a portable device in the form of a payment card.

FIG. 2B shows an example of a portable device 215 in the form of a card. The features in the card 150 in FIG. 1B may also be included in the portable device 215.

As shown, portable device 215 comprises a plastic substrate 215S. A magnetic stripe 215T may be on the plastic substrate 215S. User information 215V such as an account number, expiration date, and/or a user name may be printed or embossed on the card. An integrated circuit 215U for interfacing with an access device may be present on, or embedded within, the plastic substrate 215S. The integrated circuit 215U may comprise a microprocessor unit 215Q for executing programmed instructions. The integrated circuit 215U may further comprise an I/O controller 215R. The I/O controller 215R manages the flow of data between the microprocessor unit 215Q and a Card Acceptance Device (CAD) such as a point of sale terminal. Additionally, integrated circuit 215U may comprise read only memory (ROM) 215X, random access memory (RAM) 215Y, and application memory 215Z. ROM 215X can be where instructions are permanently burned into memory by a silicon manufacturer. These instructions may include when the power supply is activated and other fundamental instructions of the chip operating system. RAM 215Y can be memory that serves as a temporary storage of results such as verification results or any other input/output communications. Application memory 215Z can be memory that is used by an executing application to store information on portable device 215 and may be electronically erased and rewritten. Examples of executing applications may include a payment application, verification application, etc.

Figure 3:
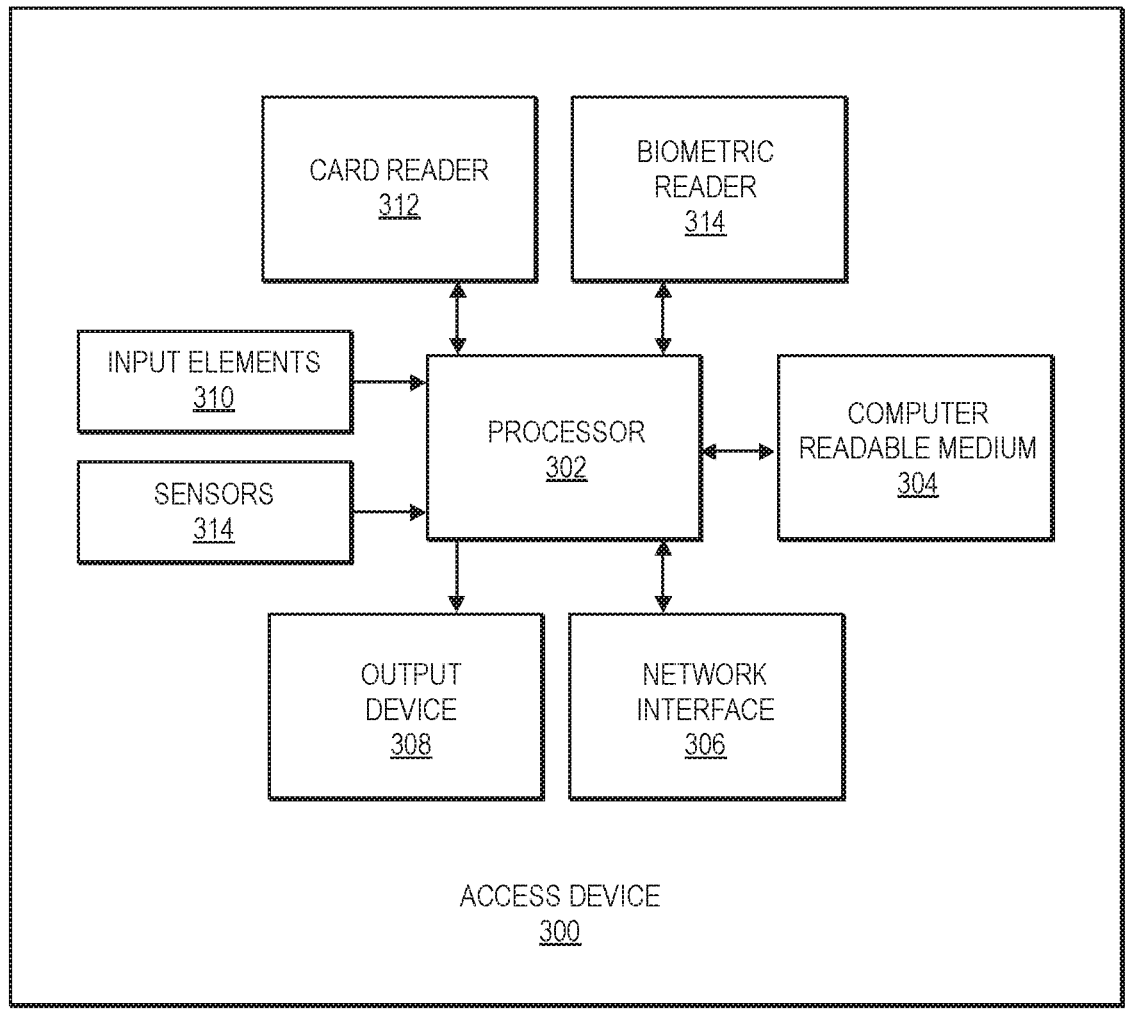
FIG. 3 shows a block diagram of an access device according to an embodiment.

FIG. 3 shows a block diagram of access device 300 according to an embodiment of the invention. The features in the biometric terminal 140 in FIG. 1B may be in the access device 300.

Access device 300 may comprise a processor 302 operatively coupled to a computer readable medium 304 (e.g., one or more memory chips, etc.), input elements 310 such as buttons or the like, one or more card readers 312 (e.g., a contact chip reader, a contactless reader, a magnetic stripe reader, etc.), one or more biometric readers 314 used to take one or more biometric samples of a user (e.g. finger, palm, iris, voice, and/or face), an output device 308 (e.g., a display, a speaker, etc.) and a network interface 306. One or more sensor(s) 314 for sensing environmental data may also be included in the access device 300. A housing may house one or more of these components.

The computer readable medium 304 may comprise instructions or code, executable by a processor 302. The instructions may include instructions for sending a command to portable device 215 upon making contact with that device, and instructions for communicating with portable device 215 to obtain credentials and process a transaction. The computer readable medium 304 may also include instructions for requesting authorizing of a transaction with the authorizing entity computer 110, and instructions for any other suitable function as described herein. For example, the computer readable medium 304 may comprise a payment application and/or payment kernel as well as a biometric processing application comprising instructions for performing biometric verification in a transaction.

Figure 4:
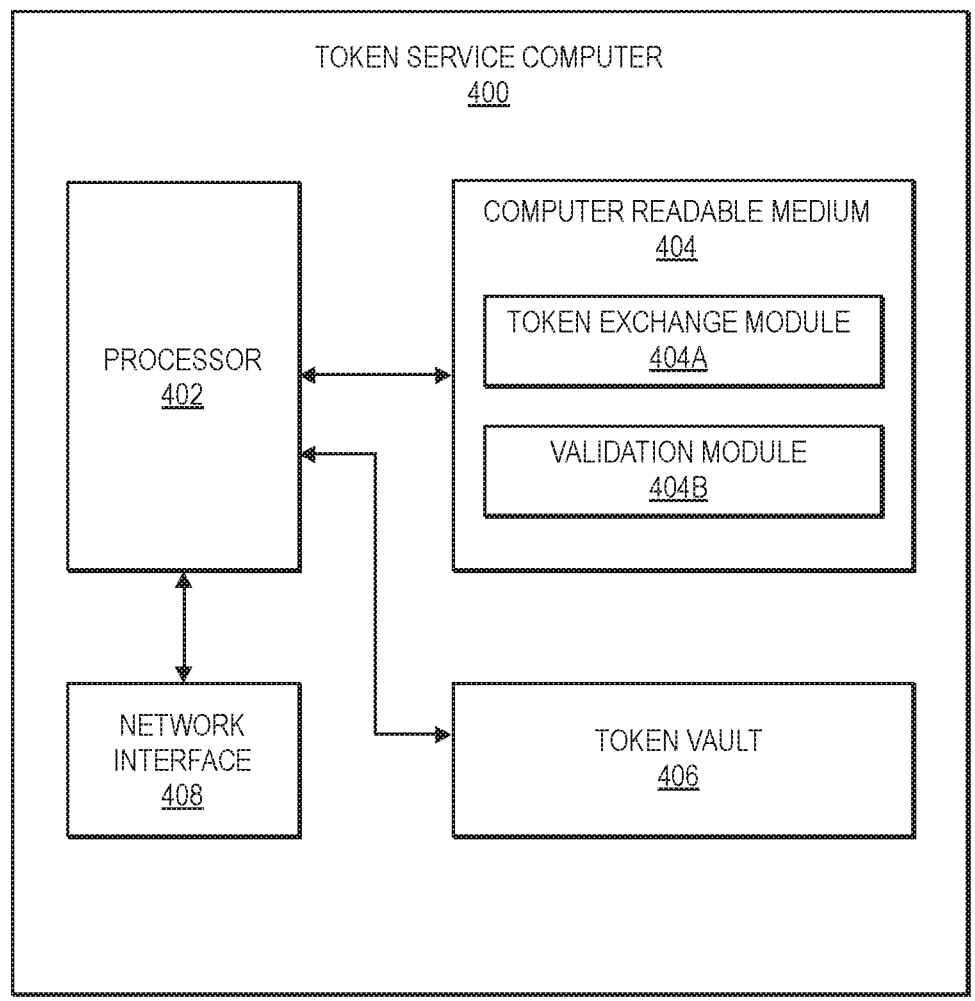
FIG. 4 shows a block diagram of a token service computer according to an embodiment.

FIG. 4 shows a token service computer 400. The token service computer 400 includes a processor 402 and a computer readable medium 404, a token vault 406, and a network interface 408 coupled to the processor 402.

The computer readable medium 404 may comprise a token exchange module 404A and a validation module 404B.

The token vault 406 may store tokens and their associated credentials in a database. The token vault 406 may store data in a database such as an Oracle™ database.

The token exchange module 404A may comprise code that causes the processor 402 to provide access tokens. For example, the token exchange module 404A may contain logic that causes the processor 402 to generate a payment token and/or associate the payment token with a set of payment credentials. A token record may then be stored in a token record database indicating that the payment token is associated with a certain user or a certain set of payment credentials.

The validation module 404B may comprise code that causes the processor 402 to validate token requests before a payment token is provided. For example, validation module 404B may contain logic that causes the processor 402 to confirm that a token request message is authentic by decrypting a cryptogram included in the message, by confirming that the payment credentials are authentic and associated with the requesting device, and by assessing risk associated with the requesting device.

Figure 5:
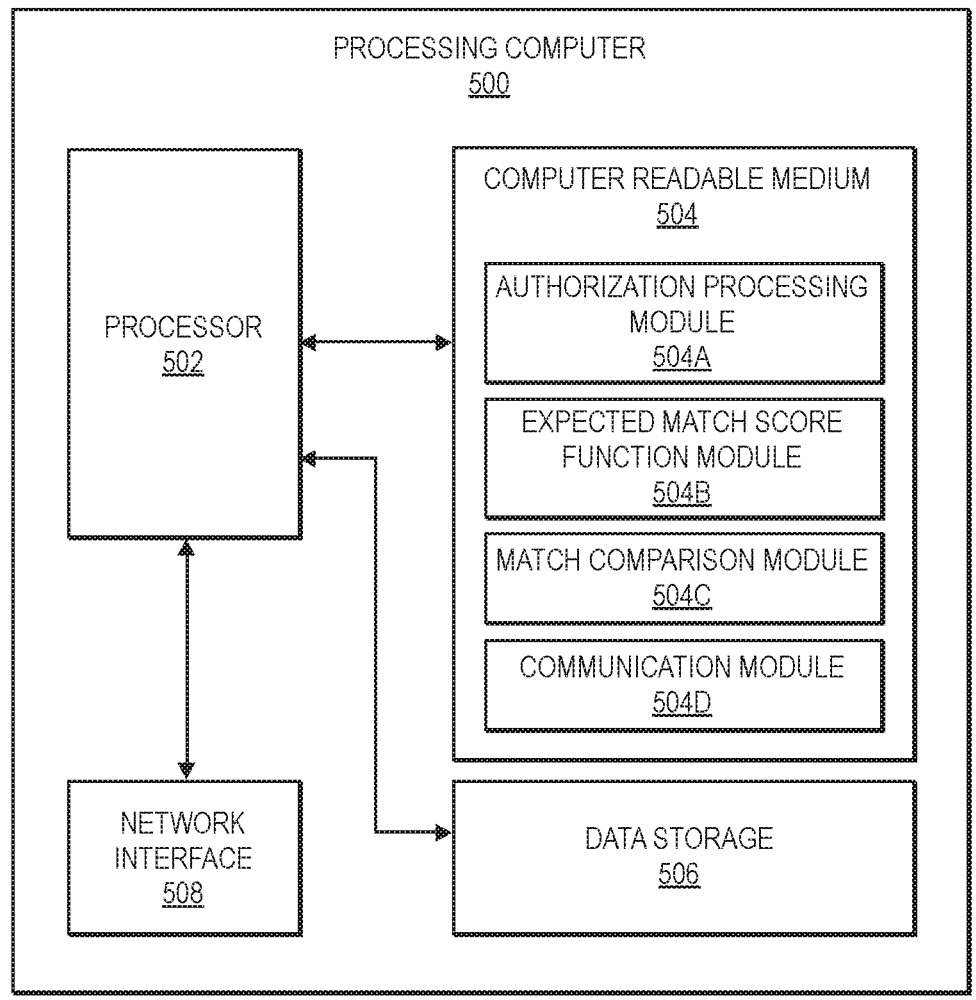
FIG. 5 shows a processing computer according to an embodiment.

FIG. 5 shows a block diagram of a processing computer 500 according to an embodiment. Although the details of the processing computer 500 are shown, it is understood that the authorizing entity computer 110 could alternatively or additionally include the components illustrated in FIG. 5.

The processing computer 500 may comprise a processor 502, which may be coupled to a computer readable medium 504, data storage 506, and a network interface 508. The data storage 506 may contain access data such as tokens and/or account data, as well as mappings between access data, credentials, and/or communication device identifiers such as phone numbers, IP addresses, device identifiers, etc.

The data storage 506 may store data that correlate potential match scores that would result from certain devices and their operational characteristics, as well as environmental conditions at the time of an interaction between a portable device and an access device in a transaction. Such data may be used to create expected match value functions in advance of or during a transaction to be evaluated. For example, the data storage 506 may include a table of data including different device types and expected match scores that they might produce given different environmental conditions (e.g., temperature, humidity, noise, etc.) and/or different device operational characteristics (e.g., low battery, device age, etc.). This data may be used to create a function that can be used to estimate an expected match score for a transaction that is conducted under a specific set of environmental or device conditions.

The computer readable medium 504 may comprise a number of software modules including an authorization processing module 504A, an expected match score function module 504B, a match comparison module 504C, and a communication module 504D. The computer readable medium may also comprise a clearing and settlement module (not shown).

The authorization processing module 504A may comprise code that can cause the processor 502 to evaluate authorization request messages for transactions and determine if the transactions should be authorized. The authorization processing module 504A may also include code for routing or modifying authorization request and response messages as they pass between various parties such as authorizing entity computers (e.g., issuer computers) and transport computers (e.g., acquirer computers).

The expected match score function module 504B, in conjunction with the processor 502, generate or retrieve an expected match score function. Expected match score functions may be derived from past data from a particular user or a group of users, and may be generated based upon one or more environmental conditions, or one or more device characteristics. Such functions may have any suitable number of dimensions.

The match comparison module 504C may include code, executable by the processor 502, to compare a biometric match score against a threshold and/or to an expected match score function to determine of an interaction can proceed.

The communication module 504D may comprise code that causes the processor 502 to generate messages, forward messages, reformat messages, and/or otherwise communicate with other entities.

Methods according to embodiments can now be described with reference to at least FIG. 1.

Referring to FIG. 1, a user 101 may wish to use a portable device 102 to interact with an access device 104 at a resource provider (e.g., a merchant, a secure data access provider, or an entity that provides secure access to a location).

In step S108, the user 101 may use the portable device 102 to interact with the access device 104. For example, the user may insert the portable device 102 into a slot in the access device 104, or the portable device 102 may be in wireless (e.g., Bluetooth) communication with the portable device 102. As a result of the interaction, the access device 104 may prompt the user to provide a biometric sample such as a fingerprint, a retinal scan, or facial scan to the access device 104.

In step S110, the user 101 provides the requested biometric sample to the access device 102. The access device 104 may then convert the biometric sample into biometric data and a subsequent biometric template.

In step S112, the biometric template can be provided by the access device 104 to the portable device 102 along with various other data including a terminal identifier and a transaction amount. The biometric verification applet on the portable device can then compare the received biometric template with a stored biometric template, and may then produce a match score. The match score, the other data such as the terminal identifier, transaction amount, and credentials (e.g., a PAN or token) stored on the portable device 102 may be signed by a secret cryptographic key on the portable device 102. The match score, the credentials, and the signed data may then be returned to the access device 104.

Before or during the interaction between the portable device 102 and the access device 104, in steps S102, S104, S106, additional data may be obtained from one or more of the access device, the portable device 102, and/or one or more sensor(s) 109. The additional data may be environmental data associated with the location of the portable device 102 and the access device 104. The additional data may also include data regarding the inherent or operational characteristics of the device that captures the biometric sample. In this example, that device would be the access device 104. Such additional information may be transmitted to the processing computer 108 periodically, out of band of the transaction messaging, or it may be delivered in the transaction messaging. For example, the sensor(s) 109 may measure environmental data such as the temperature, humidity, and/or amount of light at the location. This information may be transmitted to the processing computer in step S106.

It is also noted that the sensor(s) 109 may or may not be in communication with the processing computer 108 or the other components in FIG. 1A in some embodiments. In some embodiments, the processing computer 108 could retrieve, for example, information regarding environmental conditions at a particular location from a source such as a Website that provides data regarding such environmental conditions. An exemplary Website might be, for example, a weather Website which provides information about the temperature and humidity at a particular location where a transaction is occurring.

After receiving the signed data, the match score, and a credential such as a token from the portable device 102, the access device 104 may generate and transmit an authorization request message comprising the token and the amount of the requested resource to the processing computer 108 along with the match score and the signed data.

In steps S113, S114, the processing computer 108 may receive the authorization request message via the transport computer 106, and may detokenize the token by communicating with the token service computer 112. In step S118, the processing computer 108 may make a request to obtain the credential that was associated with the token. After the token service computer 112 receives the request, it may look up the credentials (e.g., a primary account number) corresponding to the received token, and may return the credentials to the processing computer 108. After receiving the credentials, the processing computer 108 may then modify the authorization request message to include the credentials, instead of the token.

Before, during, or after step S118, the processing computer 108 can evaluate the additional data received in steps S106, S102, and/or S104, and may store it in a database. For example, the temperature or humidity at the time of the interaction of the portable device 102 and the access device 104 are stored along with the location (e.g., latitude and longitude) of these devices. This information may be used to generate or obtain the expected match score function.

The processing computer 108 may then verify the signed data in the authorization request message to ensure that the match score corresponds to the current transaction. In this example, the processing computer 108 may obtain the biometric match score from the portable device 102 by receiving it in the authorization request message, and then extracting it from the authorization request message. The processing computer 108 may also compare the match score to the threshold, and also an expected match score function, to determine if the current interaction is associated with an elevated risk (e.g., due to the biometric being verified being one that was inauthentic). Various ways of comparing are discussed below in conjunction with FIGS. 6, 7, and 8. If the transaction is associated with an elevated risk, the processing computer 108 may make a determination as to whether or not the transaction is to proceed. If it is not to proceed, then the processing computer 108 may transmit an authorization response message back to the access device 104 via the transport computer 106 declining the transaction. If the transaction is to proceed, then the process can proceed to step S120. In other embodiments, the determination as to whether or not the transaction is to proceed can be in the form of a biometric match reliability score, which may be transmitted to the authorizing entity computer 110 in an authorization request message.

In step S120, the authorization request message comprising the amount of the requested resource and the real credential is transmitted to the authorizing entity computer 110. The authorization request message sent in step S120 may or may not contain the match score, the expected match score function, the additional data (e.g., the sensor data) as well as the threshold data that was obtained by the processing computer 108.

After receiving the authorization request message, the authorizing entity computer 110 may then authorize or not authorize the transaction. In some embodiments, the authorizing entity computer 110 could base its authorization decision using the additional data including the environmental or device conditions associated with the transaction. This could be done in lieu of or in addition to the processing computer 108. In this case, the authorizing entity computer 110 may have a data storage similar to the data storage 506 in FIG. 5. After making the authorization decision, the authorizing entity computer 110 may generate an authorization response message with its decision. Criteria which the authorizing entity computer 110 may use to authorize or not authorize the transaction may include a risk associated with the transaction, as well as whether or not the user 101 has sufficient credit or funds to obtain the requested resource.

In step S122, the authorization response message may then be transmitted to the processing computer 108. The processing computer 108 may then communicate with the token service computer 112 in step S124 to obtain the token associated with the credential. The token service computer 112 can use the credential to search a database for the token that corresponds to the credential in the authorization response message.

After receiving the credential from the token service computer 112, in steps S126, S128, the processing computer 108 can send the authorization response message back to the access device 104 via the transport computer 106.

At a later date or time, a clearing and settlement process may take place between a transport computer 106 of an acquirer associated with the access device 104, the processing computer 108, and the authorizing entity computer 110.

The processes described with respect to FIG. 1A is illustrative and is not intended to be limiting. For example, in the example described above in FIG. 1A, the processing computer 108 performs the validation of the match score. However, in other embodiments, the match score may be validated by the authorizing entity computer 110 instead. In this case, the authorizing entity computer 110 can have the ability to store or generate the expected match score function. Further, although the process flow shown in FIG. 1A involves the use of a token, in other embodiments, a real credential may be used without a tokenization process. In another example, in the process flow described above, although a biometric sample is provided to the access device 104, and is provided to the portable device 102, the biometric sample can be obtained by the portable device 102. The portable device 102 can then perform the above described match process.

Figure 6:
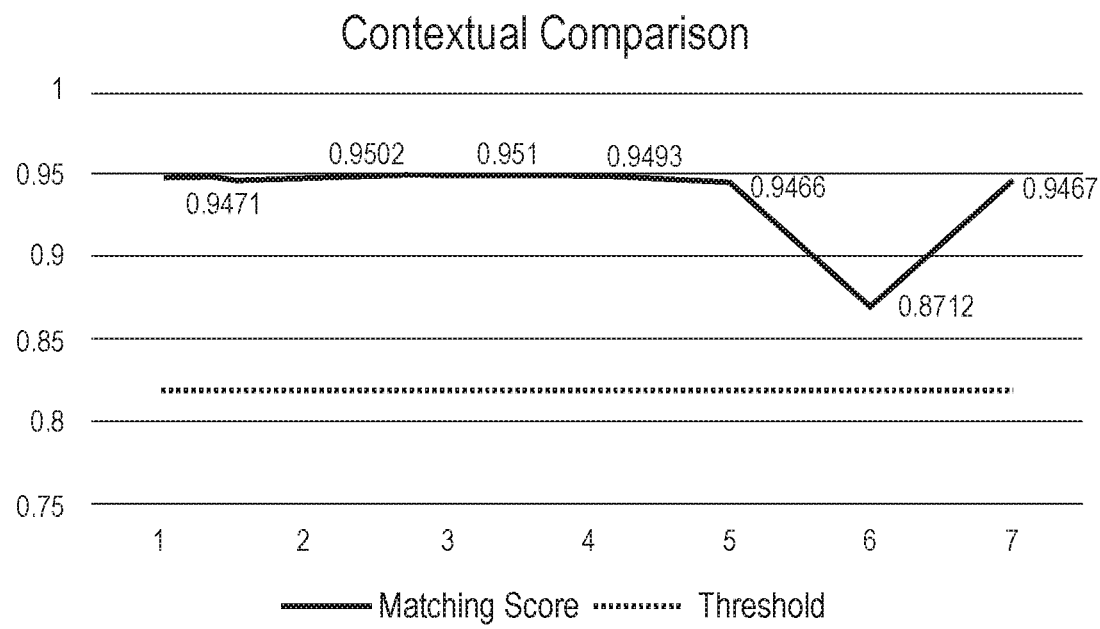
FIG. 6 shows a graph illustrating different match scores for different authentication attempts for a user relative to a static threshold.

FIG. 6 shows a graph illustrating different match scores for different authentication attempts for a user relative to a static threshold. FIG. 6 shows different match scores for seven different transactions. The "threshold" line shows a base matching threshold (e.g., about 0.82), and every match score lies above the threshold. However, the match score 0.8712 may be different than the other match scores obtained under similar environmental conditions and this may suggest that an abnormal or inauthentic biometric sample was used, even though all match scores are above the threshold. In this case, the match score function may correspond to a line that passes through the match scores 0.9471, 0.9502, 0.951, 0.9493, 0.9466, and 0.9467. This match score function would be substantially similar to the line 0.95. Since the value 0.8712 deviates significantly from this line, the value would be considered abnormal despite the fact that it is above the threshold.

Figure 7:
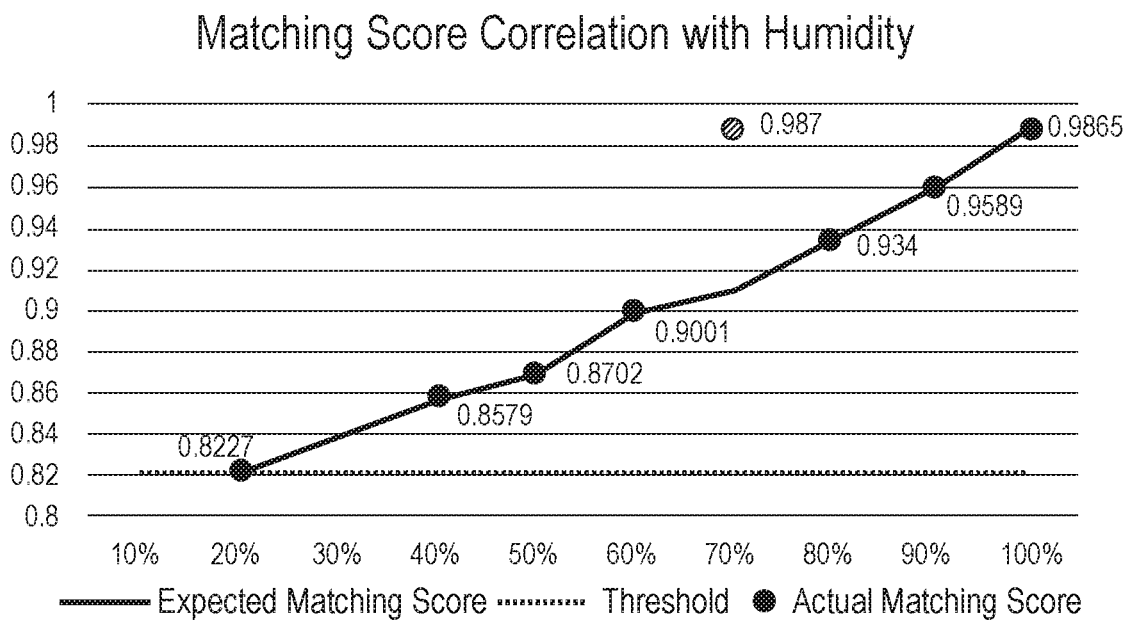
FIG. 7 shows a graph illustrating a match score correlation with humidity.

FIG. 7 shows a graph illustrating a match score correlation with humidity. As shown, there is a matching threshold of about 0.82, and there is also a line for an expected match scores, given the humidity at the particular location at which the interaction is being conducted. This line can form the expected match score function. If a match store of 0.987 is received for a particular transaction, and is much better than the expected match score (as determined by the expected match score function) associated with given humidity, then the biometric sample associated with the interaction may be potentially fraudulent, even though the match score is above the match score threshold.

Figure 8:
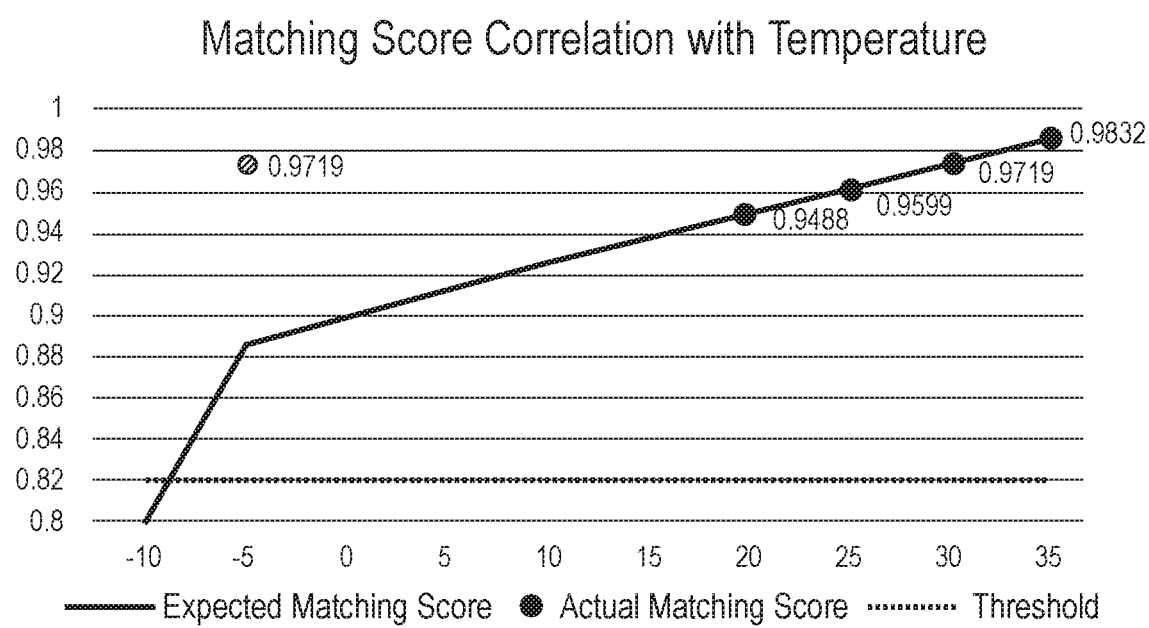
FIG. 8 shows a graph illustrating a match score correlation with temperature.

FIG. 8 shows a graph illustrating a match score correlation with temperature. Different expected match scores would be associated with different temperatures. As shown, the match score 0.9719 at a temperature of −5 degrees would deviate significantly from the expected match score (as determined by the match score function which may correspond to the line including points 0.9488, 0.9599, 0.9719, 09.832) for that temperature. This could raise an issue that the biometric sample that was used to create that match score is not authentic.

Embodiments of the invention have a number of advantages. As noted above, embodiments of the invention can be used to identify potentially fraudulent biometric interactions, even when match thresholds are exceeded. In addition, since expected match scores are used, it is possible to allow transactions that might otherwise be below a threshold if the environmental conditions at a location might reasonably produce a lower match score. As such, embodiments of the invention result in improvements over conventional systems.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   obtaining, by a computer, a biometric match score from a device that is used to conduct an interaction at a location, wherein the computer and the device are separate devices;
   receiving, by the computer, additional data associated with the device or the location;
   determining, by the computer, an expected match score function based upon at least the additional data, wherein the additional data comprises environmental data pertaining to an environment at the location, and wherein the expected match score function is a function that provides match scores based upon the environmental data comprising temperature and/or humidity data;
   comparing, by the computer, the biometric match score to the expected match score function; and
   determining, by the computer, if the interaction is to proceed based on at least the comparing.

2. The method of claim 1, wherein the interaction is an access transaction to access a building or a secure location.

3. The method of claim 1, wherein the expected match score changes based upon the environmental data in the expected match score function.

4. The method of claim 1, wherein the expected match score changes based upon the environmental data in the expected match score function, wherein the expected match score increases as the environmental data increases.

5. The method of claim 1, wherein the device is a mobile communication device operated by a user of the mobile communication device.

6. The method of claim 1, wherein the device is an access device which communicates with a mobile communication device operated by a user.

7. The method of claim 1, wherein obtaining the biometric match score comprises:
   receiving the biometric match score.

8. The method of claim 1, wherein the interaction is a payment transaction.

9. A computer comprising:
   a processor; and
   a computer readable medium coupled to the processor for implementing a method comprising:
   obtaining, by the computer, a biometric match score from a device that is used to conduct an interaction at a location, wherein the computer and the device are separate devices;
   receiving additional data associated with the device or the location;
   determining an expected match score function based upon at least the additional data, wherein the additional data comprises environmental data pertaining to an environment at the location, and wherein the expected match score function is a function that provides match scores based upon the environmental data comprising temperature and/or humidity data;
   comparing, by the computer, the biometric match score to the expected match score function; and
   determining, by the computer, if the interaction is to proceed based on at least the comparing.

10. The computer of claim 9, wherein the interaction is an access transaction to access a building or a secure location.

11. The computer of claim 9, wherein the additional data comprises information about a state of the device.

12. The computer of claim 9, wherein the device is a mobile communication device operated by a user.

13. The computer of claim 9, wherein the device is an access device, and the computer is a processing computer or an authorizing entity computer.

14. The computer of claim 9, wherein the interaction is a payment transaction.

15. A method comprising:
   receiving, by a device, a biometric sample from a user;
   determining, by the device, a biometric match score; and
   transmitting, by the device, the biometric match score to a processing computer in an interaction, wherein the processing computer is separate from the device, and determines an expected match score function based upon at least additional data associated with the device or a location of the device, compares the biometric match score to the expected match score function, and determines if the interaction is to proceed based on at least the comparing, wherein the additional data comprises environmental data comprising temperature and/or humidity data pertaining to an environment at the location, and wherein the expected match score function is a function that provides match scores based upon the environmental data.

16. The method of claim 15, wherein the additional data is data pertaining to the device.

17. The method of claim 15, wherein the device is an access device.

18. The method of claim 15, wherein the interaction is a payment transaction.

19. The method of claim 15, wherein the device is a POS terminal.

20. The method of claim 15, wherein the device is a mobile phone.

* * * * *